United States Patent [19]

Burdorf

[11] 3,955,777

[45] May 11, 1976

[54] SELF THREADING LEADER FOR A REEL OF TAPE

[75] Inventor: Donald L. Burdorf, Newport Beach, Calif.

[73] Assignee: BASF Aktiengesellschaft, Ludwigshafen (Rhine), Germany

[22] Filed: Aug. 16, 1974

[21] Appl. No.: 498,037

[52] U.S. Cl. .................. 242/192; 206/53; 242/74; 242/195; 242/197; 242/210; 360/134
[51] Int. Cl.² .................. G11B 15/66; B65H 75/28
[58] Field of Search .......... 242/192, 195, 197, 210, 242/74; 206/53; 360/134

[56] References Cited
UNITED STATES PATENTS

| | | | |
|---|---|---|---|
| 3,773,276 | 11/1973 | Ganske | 242/192 |
| 3,797,777 | 3/1974 | Hosono et al. | 242/195 |
| 3,809,218 | 5/1974 | Furst | 242/195 |
| 3,836,094 | 9/1974 | Hollingsworth | 242/192 |

*Primary Examiner*—George F. Mautz

[57] ABSTRACT

An improved self threading leader for a reel of recording tape which engages only itself as it is wrapped around the supply reel to maintain the reel's integrity and which engages a take-up hub to begin winding therearound when the reel is used with a tape transport unit of the type having a capstan to drive a supply reel and take-up hub by surface contact.

3 Claims, 7 Drawing Figures

SELF THREADING LEADER FOR A REEL OF TAPE

BACKGROUND OF THE INVENTION

This invention relates to self-threading systems for handling reels of record tape, such as magnetic recording tape. Particularly where intended for consumer use, it is desirable to provide such systems, in order to minimize inexperienced handling of tape, as in threading, packing, etc. Proposals have been made for various mechanical catches, grippers, etc., on the take-up hub, but in situations where the take-up reel must be smooth and free from bumps, these devices are not desirable. One suggestion to overcome the foregoing disadvantages has been to employ a leader with an adhesive surface. However, this is impractical from the standpoint of deterioration of the adhesive due to aging, drying, etc. Other proposals which overcome many of the disadvantages associated with winding on the take-up hub utilize a flexible leader with toothed flanges to grip the take-up hub and permit the leader to begin winding therearound. Both the leader disclosed in the U.S. Pat. No. 3,773,276 and the leader disclosed in United Kingdom Pat. No. 1,244,539 are of this type. These known leaders, however, employ the gripping means to also engage the side edges of the outer tape convolutions when the leader is wrapped around the supply reel to maintain the reel's integrity. This gripping of the edges of the actual tape presents the possibility of damage to the tape edges. The damage is of concern especially in applications where large numbers of parallel tracks are recorded on a single reel of tape. For example, when 25 tracks are recorded on a 0.250 inch wide tape the individual tracks are necessarily less than 0.010 of an inch wide. With such narrow tracks a seemingly slight amount of damage to the tape edge can severely damage the track or tracks near that edge. Therefore, although the toothed design solved many of the problems associated with winding the tape around the take-up hub, the design as employed in the known leaders has serious disadvantages resulting from the teeth gripping the tape edges on the supply reel. The present invention offers a solution to the problem.

OBJECTS OF THE INVENTION

The primary object of the invention is to provide a self-threading leader which wraps smoothly onto the take-up hub and which maintains the integrity of the supply reel without damaging the edges of the outermost convolutions of tape.

Other objects and advantages of the invention will be apparent from the following descriptions, the accompanying drawings and the appended claims.

THE DRAWINGS

BRIEF DESCRIPTION OF THE INVENTION

The improved leader is similar in basic configuration to an embodiment of the leader disclosed in the aforementioned United Kingdom patent which has a first, toothed, portion of the leader spliced to a second, untoothed, portion. Both portions are of a length and configuration to make one smooth wrap around the take-up hub. The improved leader differs from the known leader significantly however, in that the first, toothed, portion has spacial special relationship between the two flanges of teeth such that the teeth will not grip the edges of the outermost convolutions of tape when wrapped around the supply reel. Instead the teeth grip only the second, untoothed, portion of the leader. The improved design facilitates both the gripping of itself by the leader to maintain the integrity of the reel of tape and also the automatic wrapping of the leader around the take-up hub, which is correspondingly wider to permit the leader to grip its edges.

The improved leader design can be used with tape transport systems in which the circumference of the take-up hub is more than half that of the supply reel. This relationship is made necessary by the fact that the combined length of the two leader portions, the length of each of which is almost exactly equal to the circumference of the take-up hub, must be greater than the circumference of the supply reel in order to permit the requisite overlap between the two leader portions.

DETAILED DESCRIPTION OF THE PREFERRED EMBODIMENT

Figure 1:
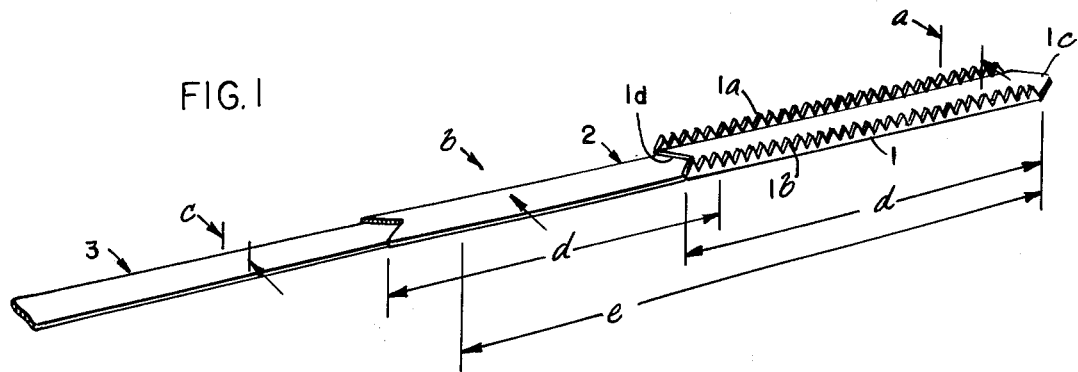
FIG. 1 is a pictorial view of the improved leader attached to the end of a magnetic tape strip.
Figure 2:
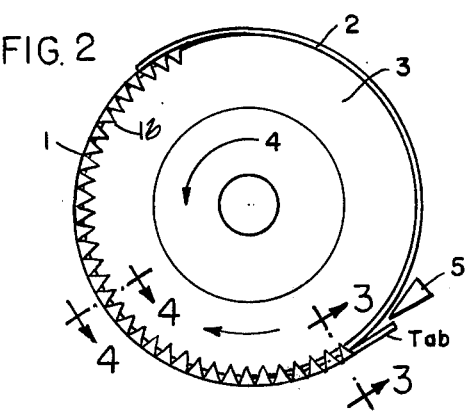
FIG. 2 is a view of the improved leader wrapped around a supply reel of tape.
Figure 3:
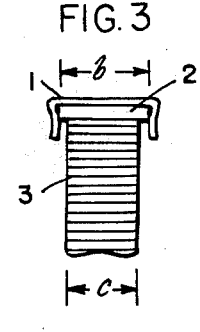
FIG. 3 is a cross-sectional view illustrating the gripping of the edges of the second leader portion by the first leader portion.
Figure 4:
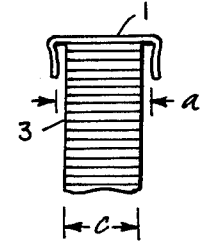
FIG. 4 is a cross-sectional view illustrating the lack of contact between the gripping means of the first leader portion and the reel of tape.

FIG. 1 shows the improved leader. A first portion 1 of the leader has pre-formed gripping means 1a and 1b resembling teeth along its edges. A second portion 2 of the leader is spliced to portion 1 and has no such gripping means. This second leader portion 2 is in turn spliced to tape 3. The gripping means 1a and 1b are formed to have a natural spacing $a$ therebetween less than the width $b$ of second leader portion 2 but greater than the width $c$ of tape 3. This relationship permits the gripping means 1a and 1b to press against the side edges of second leader portion 2 but not against the edges of tape 3 when the tape and leader are wound on hub 4 as shown in FIG. 2. In this manner the integrity of the reel of tape is maintained without actually gripping the edges of tape 3. FIGS. 3 and 4 are cross-section views of the tape pack shown in FIG. 2 illustrating how gripping means 1a and 1b grip the edges of second leader portion 2 but not the edges of tape 3.

Figure 5:
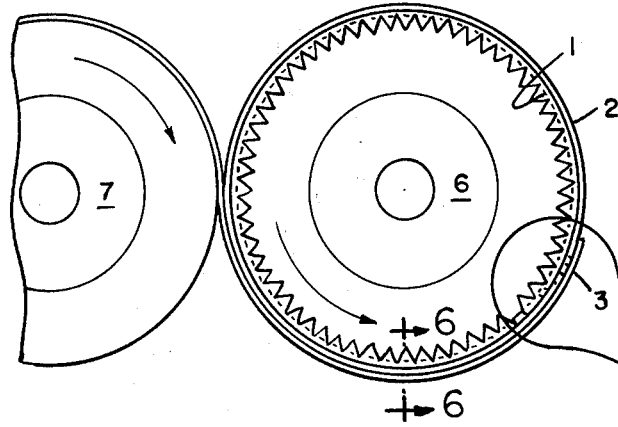
FIG. 5 is a view of the improved leader wrapped around a take-up hub.
Figure 5A:
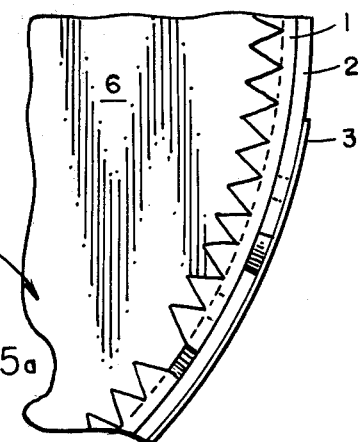
FIG. 5a is an enlarged view of a portion of the improved leader as shown in FIG. 5.

The leading end 1c of the toothed leader portion 1 is free to extend tangentially away from the periphery of the reel as shown in FIG. 2. This feature permits a stationary peeling means 5 to release the hold of gripping means 1a and 1c on the edges of second leader portion 2 as the supply reel is rotated in the direction indicated in FIG. 2. The trailing end 1d of toothed leader portion 1 is cut to complement the leading end 1c. The length $d$ of toothed leader portion 1 is slightly less than the circumference of take-up hub 6 so that the point of leading end 1c penetrates into the complementary recess of trailing end 1d to eliminate the occurrence of a bump when the leader is wrapped around the periphery of take-up hub 6 as shown in FIG. 5.

Figure 6:
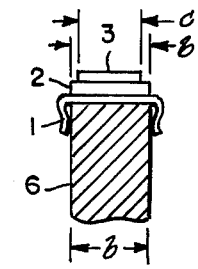
FIG. 6 is a cross-sectional view illustrating the gripping of the hub edges by the first leader portion.

The leading and trailing ends of second leader portion 2 have a similar complementary relationship. The length of leader portion 2 is also slightly less than the circumference of take-up hub 6 so that a bump is eliminated when leader portion 2 is wrapped on top of leader portion 1 around the periphery of take-up hub 6. FIG. 6 is a cross-sectional view showing leader portions 1 and 2 wrapped around the take-up hub 6.

The width $b$ of take-up hub 6, being greater than the natural spacing $a$ between the toothed flanges of leader portion 1 results in the gripping means 1$a$ and 1$b$ pressing against take-up hub 6 to permit the leader to begin wrapping around take-up hub 6 when the leader passes between the interface of capstan 7 and take-up hub 6.

There is one size criterion which must be met to employ the above described leader. The supply reel of tape must have a circumference more than $d$ but less than $e$ in FIG. 1. The minimum length is necessary to prevent interference between the leading and trailing ends 1$c$ and 1$d$ of leader portion 1. The maximum length is necessary to assure than gripping means 1$a$ and 1$b$ of leader portion 1 engages at least a portion of leader portion 2 in order to maintain the integrity of the supply reel of tape.

I claim:
1. A self-threading leader for use with a reel of recording tape, said leader comprising:
   a first leader portion attached to an end of said recording tape and having a width greater than the width of said tape,
   a second leader portion adjacent to said first leader portion having a means for gripping the edges of said first leader portion without engaging the edges of said recording tape,
   the combined length of said first and second leader portions being greater than the circumference of said reel of recording tape so that, when said leader is coiled about the outer circumference of said reel, the gripping means of said second leader portion will engage the edges of said first leader portion thereby maintaining the integrity of said reel.

2. The leader of claim 1 wherein the length of said first leader portion is the same as the length of said second leader portion.

3. The leader of claim 1 wherein said gripping means comprises inwardly projecting teeth which are formed along the edges of said second leader portion.

* * * * *